United States Patent [19]

Mihara et al.

[11] Patent Number: 4,532,600
[45] Date of Patent: Jul. 30, 1985

[54] ELECTRONIC INTEGRATING METER

[75] Inventors: Yuji Mihara, Yokohama; Ryoji Gamo, Kawasaki, both of Japan

[73] Assignee: Tokyo Shibaura Denki Kabushiki Kaisha, Japan

[21] Appl. No.: 367,788

[22] Filed: Apr. 12, 1982

[30] Foreign Application Priority Data

Apr. 13, 1981 [JP] Japan .................. 56-55448
Oct. 7, 1981 [JP] Japan ................. 56-159698

[51] Int. Cl.³ .............................. G01P 3/42
[52] U.S. Cl. .................... 364/565; 73/519; 324/166; 364/483
[58] Field of Search ........... 377/3, 15, 16, 19, 26, 377/39, 52, 89, 21, 112; 364/571, 483, 486, 510, 581, 565; 324/161, 164, 167, 166, 168, 179; 73/861.77, 518, 519

[56] References Cited

U.S. PATENT DOCUMENTS

| | | | |
|---|---|---|---|
| 3,729,996 | 5/1973 | Metz | 377/19 |
| 3,754,241 | 8/1973 | Maehara | 377/3 |
| 3,778,833 | 12/1973 | Castrovillo et al. | 377/3 |
| 3,808,407 | 4/1974 | Ratz | 377/19 |
| 3,854,038 | 12/1974 | McKinley | 364/510 |
| 3,870,963 | 3/1975 | Groce et al. | 377/39 |
| 4,134,026 | 1/1979 | Sone et al. | |
| 4,138,608 | 2/1979 | Brugger et al. | |
| 4,253,341 | 3/1981 | Ikeda et al. | 73/861.77 |
| 4,276,468 | 6/1981 | Nagamoto et al. | 377/19 |
| 4,296,471 | 10/1981 | Goux | 364/424 |
| 4,306,457 | 12/1981 | Fukui et al. | 73/861.77 |
| 4,323,976 | 4/1982 | Radaelli et al. | 364/565 |

FOREIGN PATENT DOCUMENTS

54-68266 6/1979 Japan .
54-141166 11/1979 Japan .

*Primary Examiner*—Errol A. Krass
*Assistant Examiner*—Edward R. Cosimano
*Attorney, Agent, or Firm*—Finnegan, Henderson, Farabow, Garrett & Dunner

[57] ABSTRACT

An electronic integrating meter comprises a rotatable body having a magnet attached thereto and rotatable in proportion to a quantity to be measured, a magneto-resistive element having a pair of resistances variable responsive to the magnetic field generated as the magnet varies in position upon rotation of said rotatable body, a circuit for generating first clock pulses during intervals of time alternately variable based on two time constants determined by said resistances each time a second clock signal is applied, a device for producing a switching control signal from the second clock signal, and a counter responsive to said switching control signal for counting the first clock pulses during the alternate periods of time determined by the two time constants and for producing the difference between the resulting counts, a flip-flop for producing an output each time the excess between counts switches from one train to the other and logic apparatus for weighting the output of the flip-flop.

10 Claims, 11 Drawing Figures

ELECTRONIC INTEGRATING METER

BACKGROUND OF THE INVENTION

1. Field of the Invention

The present invention relates to an electronic integrating meter for totalizing electric energy, gas, water or other utility consumed over a period of time, and more particularly to such an electronic integrating meter for computing the quantity of utility being measured through digital processing.

2. Description of the Prior Art

Conventional integrating meters for totalizing a consumed quantity, such as of water, gas, or electrical energy, comprise a drive detection circuit for detecting the consumed quantity through revolution of a rotor such as a vane wheel, a converter circuit for converting an output signal from the drive detection circuit into a numerical value corresponding to the quantity consumed, a counter circuit for counting the output signals issued from the converter circuit, and a display circuit for enabling a display device to indicate an output from the counter circuit.

With the prior integrating meters thus constructed, weighting needs to be effected in the converter circuit dependent on the purpose for which the meter is used. For example, where the integrating meter is used for measuring the amount of water consumed, it is necessary for the converter circuit to be preset as to the number of liters of water indicated by one revolution of the vane wheel. The converter circuit may be weighted by using either switches and wires connected exteriorly to the electronic converter circuit, by the installation of a ROM (Read Only Memory) in the converter circuit. When switches are used, weighting of the converter can readily be changed, but the converter needs to be provided with terminals for reading out data from the switches, an arrangement which has prevented the meter from being made smaller in size.

It is necessary for such a water-measuring meter, for example, to detect the number of revolutions of the vane wheel to a nicety for the correct measurement of the amount of water used. To this end, the meter conventionally includes a magneto-resistive element (hereinafter referred to as "MR element") to which a constant voltage is applied and which has a resistance variable as the direction of a magnetic field changes which field is generated by a magnet rotated by the vane wheel. A change in the resistance of the MR element is detected as an output voltage signal which is supplied to one terminal of a comparator in which this output signal is compared with a reference voltage applied to another input terminal thereof, and the comparator produces a pulsed output signal.

Since the output signal from the MR element is a weak analog signal, the correct number of revolutions of the vane wheel cannot be detected when the comparator has a large offset or the reference voltage applied for comparison is unstable. The output characteristics of the comparator change to a large degree, resulting in a greater tendency to malfunction, especially when the meter is subject to large changes in the ambient temperature. A circuit which processes both analog and digital signals i.e., a hybrid functional circuit, cannot be integrated simply so as to obtain a one-chip integrated circuit. Such a circuit, therefore, is composed of a large number of parts which tend to lower reliability of the circuit in operation.

SUMMARY OF THE INVENTION

It is, therefore, an object of the present invention to provide an electronic integrating meter which will eliminate the problems experienced with known integrating meters and which will detect the number of revolutions of a vane wheel in proportion to the quantity of utility being measured, as pulses converted by a digital circuit, rather than by mechanical gearing, for reliable operation independent of changes in the ambient temperature.

Another object of the present invention is to provide an electronic integrating meter having a converter circuit in which pulses can be weighted from outside the converter circuit as desired.

Still another object of the present invention is to provide an electronic integrating meter including a one-chip digital integrated circuit.

The above objects can be achieved by an electronic integrating meter comprising: (a) a rotatable body; (b) a magnet attached to that body to rotate therewith; (c) a magneto-resistive element having at least first and second resistances, the values of which vary in response to rotation of the magnet; (d) means for developing first clock pulses; (e) circuit means, coupled to the resistances and having first and second time constants which vary as a function of the first and second resistances, respectively, for developing first and second pulses which each include a variable member of first clock pulses in the form of a pulse train, which number is representative of a respective one of the first and second time constants during predetermined time intervals; (f) means for determining which of successive first and second pulses has the greater number of first clock pulses; and (g) means, responsive to the means for determining, for indicating the occurrence of a revolution of the body.

The above and other objects, features, and advantages of the present invention will become more apparent from the following description when taken in conjunction with the accompanying drawings in which some preferred embodiments of the present invention are shown by way of example.

DETAILED DESCRIPTION OF THE PREFERRED EMBODIMENTS

Figure 1:
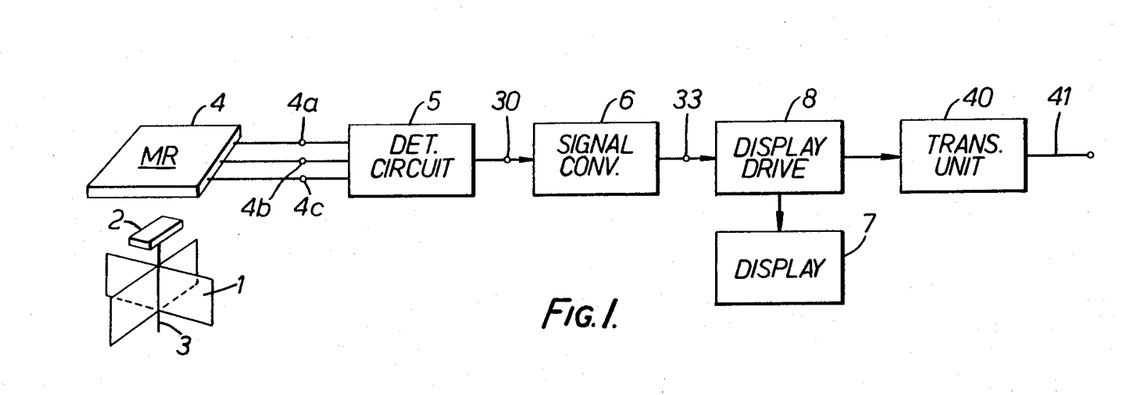
FIG. 1 is a block diagram of an electronic integrating meter according to an embodiment of the present invention as used for measuring a utility consumed, for example, the amount of water consumed.

As shown in FIG. 1, an electronic integrating meter, according to the present invention, comprises a vane wheel 1 rotatable, for example, at a speed proportional to the amount of water consumed, a shaft 3 connected coaxially to the vane wheel and supporting a permanent magnet 2 for rotation thereof with the vane wheel, a magneto-resistive (MR) element 4 disposed for generating an output signal in response to rotation of the permanent magnet 2, a drive detection circuit 5 for amplifying and shaping the waveform of an output signal from the magneto-resistive element, a signal converter circuit 6 for converting an output signal from the drive detection circuit into a numerical value corresponding to the consumed amount of water, a display drive circuit 8 for driving a display device 7 for indicating the content of an output signal from the signal converter circuit 6, and a transmission unit 40 for transmitting the displayed content to an external device over transmission line 41. The transmission unit 40 may be composed of an IC such as a part of IM6402 or IM6403 manufactured by INTERSIL.

Figure 2:
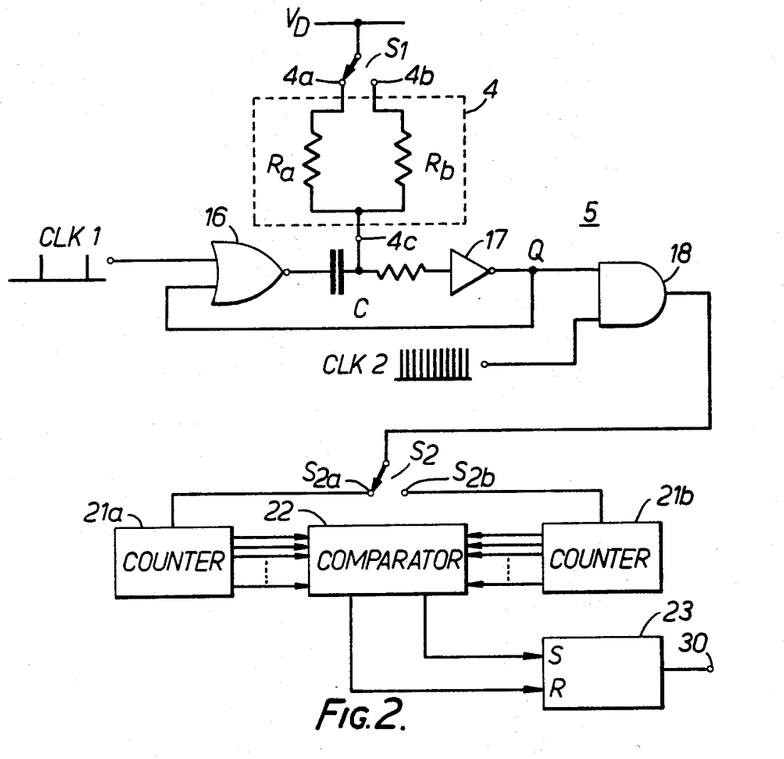
FIG. 2 is circuit diagram, partly in block form, of a magneto-resistive element and a drive detection circuit in the electronic integrating meter shown in FIG. 1.
Figure 3:
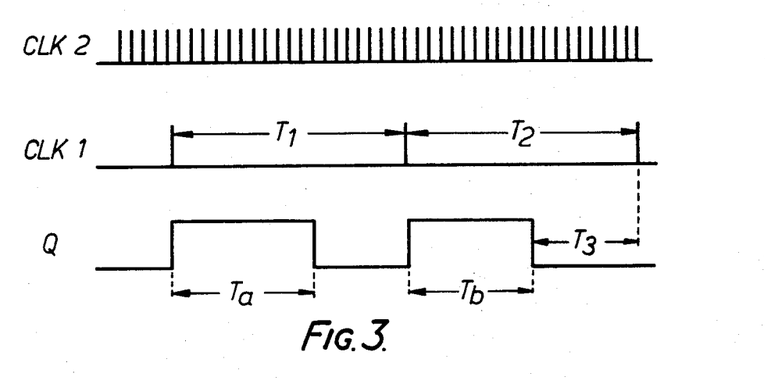
FIG. 3 is a timing diagram of signals in the circuit arrangement of FIG. 2.

FIG. 2 shows an embodiment of the drive detection circuit 5 and the MR element 4, in which the MR element is utilized to provide time constants for a monostable multivibrator for converting rotation of the vane wheel into pulses corresponding to water consumed. The MR element 4 includes a pair of resistors Ra, Rb having the resistances thereof variable as the permanent magnet 2 rotates, the resistors Ra, Rb (Ra+Rb=constant) being provided one on each side of a central terminal 4c and connected to terminals 4a, 4b, respectively. A switch $S_1$ to which supply voltage $V_D$ is applied, has a movable contact connectable alternately to the terminals 4a, 4b in synchronization with a clock signal CLK 1. The clock signal CLK 1 is divided into clock signal CLK 2, as shown in FIG. 3, which may be generated by a well-known crystal oscillator (not shown).

A NOR gate 16 and an inverter 17 jointly constitute a monostable multivibrator which is responsive to positive-going edges of the clock pulses CLK 1 for producing gate-controlling output pulses Q having respective widths governed by time constants determined by the resistor Ra and a capacitor C and by the resistor Rb and the capacitor C, respectively. The output Q from the monostable multivibrator and the clock signal CLK 2 are fed to an AND gate 18 which performs the function of logical AND and which produces an output that is delivered via a switch S2 to a N-bit counter 21a or a counter 21b. Switches S1, S2, for example, may be RCA CD 4016A type analog switch circuits and are both controlled by CLK 1.

The switch S2 is ganged with the switch S1 such that, when the movable contact of the switch S1 is connected to the terminal 4a, a movable contact of the switch S2 is connected to a terminal S2a thereof, and conversely when the movable contact of the switch S1 is connected to the terminal 4b, the movable contact of the switch S2 is connected to a terminal S2b thereof. When the terminal S2a is contacted, the output from the AND gate 18 is supplied to the counter 21a, and when the terminal S2b is contacted, the output from the AND gate 18 is fed to the counter 21b. The counters 21a, 21b produce outputs, respectively, which are supplied to a comparator 22 in which they are compared for magnitudes thereof. The results of comparison between the outputs from the counters 21a, 21b are stored in a flip-flop 23, which produces an output that serves as the output from the drive detection circuit 5.

Comparator 22, for example, may be an RCA CD4063 type comparator. When the output of counter 21a is larger than the output of counter 21b, comparator 22 outputs a high level signal to the set input of the flip-flop 23, so that the output of the flip-flop 23 is high level signal (logic level of "1"). When the output of counter 21a is smaller than the output of counter 21b, comparator 22 outputs a high level signal to the reset input of the flip-flop 23, so that the output of the flip-flop 23 is a low level signal (logic level of "0").

When the switches S1, S2 are actuated in synchronization with the clock signal CLK 1, illustrated in FIG. 3, the terminals 4a, S2a are connected to the movable contacts of switches S1, S2 during a period of time T1, and the terminals 4b, S2b are connected to the movable contacts of the switches during the succeeding period of time T2. During the period of time T1, one of the inputs of the AND gate 18 is supplied, as shown at Q in FIG. 3, with a gate-controlling pulse beginning from the positive-going edge of a clock pulse CLK 1 and having a width Ta which is determined by the time constant based on the resistor Ra and the capacitor C. The pulse width Ta is expressed by Ta≈0.7 RaC. Thus, the counter 21a continues to count and hold the clock signal CLK 2 as long as the gate-controlling pulse is applied to the AND gate 18.

The terminals 4b, S2b are then connected to the movable contacts of the switches S1, S2 during the time interval T2, with the terminals 4a, S2a open. The AND gate 18 is now open for a period of time Tb shown at Q in FIG. 3. The interval of time Tb is determined by the time constant based on Rb and C, and is given by Tb≈0.7 RbC. The counter 21b, therefore, counts and holds the clock signal CLK 2 during the time interval Tb. The contents of the counters 21a, 21b are fed to and compared in the comparator 22, the output of which is stored in the flip-flop 23.

Figure 4:
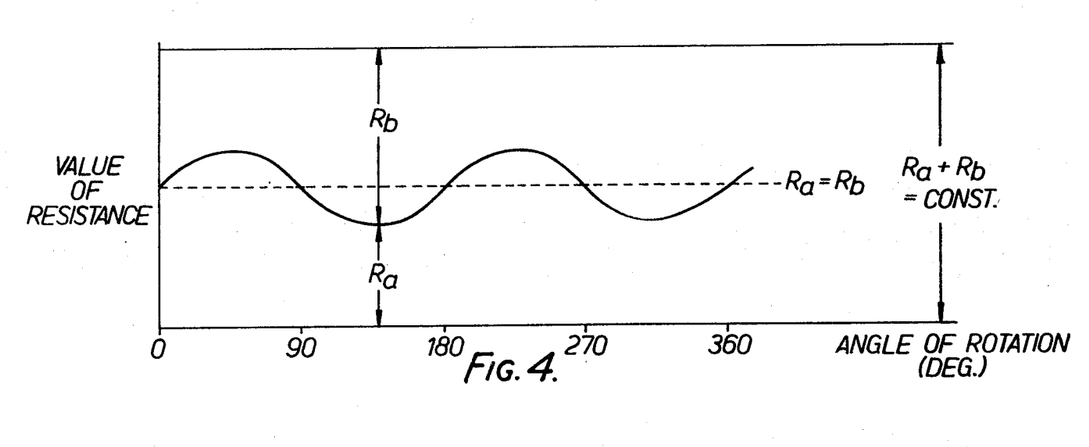
FIG. 4 is a diagram explanatory of operation of the magneto-resistive element for producing an output.

As the permanent magnet 2 rotates in response to rotation of the vane wheel 1, the resistance at the central terminal 4C of the MR element 4, as supplied with an electric current, varies as shown in FIG. 4 in two cycles per revolution of the permanent magnet. Assuming that the flip-flop 23 produces an output which has a logic level of "1" when Ta≧Tb and a logic level of "0" when Ta<Tb, and that the central resistance of the MR element 4 varies sinusoidally as illustrated in FIG. 4, the output of the flip-flop 23 has a logic level of "1" when the resistors of the MR element 4 meet the relationship Ra≧Rb, and the output of flip-flop 23 has a logic level of "0" when the resistors of the MR element 4 meet the relationship Ra<Rb. With the frequency of the clock signal CLK 1 being selected so as to be sufficiently large with respect to that of rotation of the vane wheel 1, the flip-flop 23 generates an output wherein two rectangular pulses reflect one revolution of the vane wheel 2. The output pulse of the flip-flop 23 is then converted into a signal that is displayed on the display 7, which is indicative, in the example, of the amount of water consumed.

Figure 5:
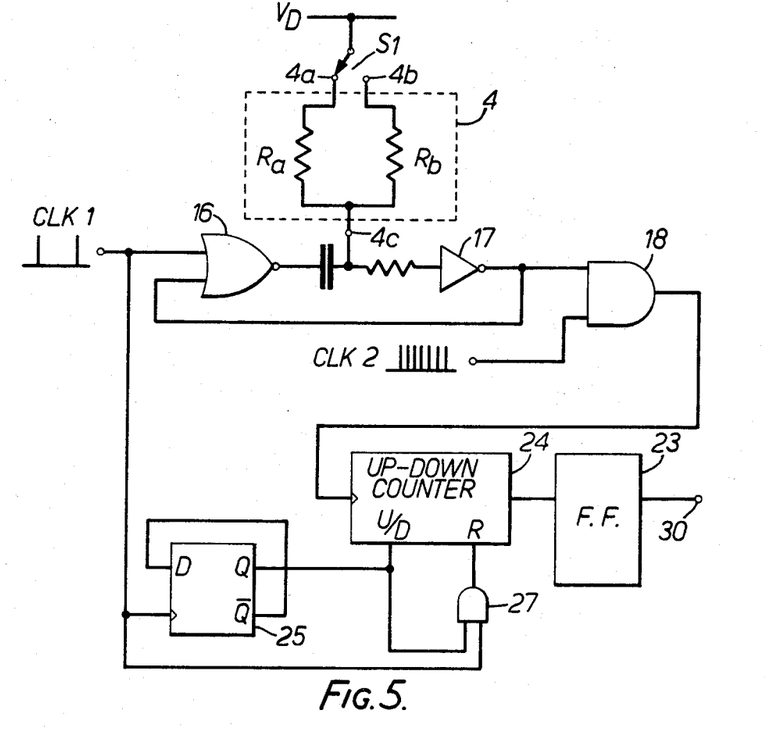
FIGS. 5 and 6 are circuit diagrams, partly in block forms, of drive detection circuits according to other embodiments of the invention.

FIG. 5 shows a drive detection circuit constructed according to another embodiment of the invention. Identical parts in FIG. 5 are designated by identical reference characters in FIG. 2.

The drive detection circuit illustrated in FIG. 5 comprises an up-down counter 24 having a clock input terminal to which the output of the AND gate 18 is connected. The Q terminal of a flip-flop 25 is connected at the U/D terminal of the up-down counter 24 and the output of an AND gate 27, functioning as a logical AND gate between CLK 1 and the Q output, is connected at the R terminal of the counter 24. The flip-flop 25 is responsive to clock signal CLK 1 to generate a signal for controlling the up-down counter 24 to operate in a count-up mode or a count-down mode in the period of time T1 or T2, respectively. More specifically, the up-down counter 24 functions as an up counter during the time interval T1. Thus, the up-down counter 24 counts up clock pulses CLK 2 in response to energization of the AND gate 18 during the period of time Ta determined by the resistor Ra and the capacitor C. During the period of time Tb governed by the resistor Rb and the capacitor C, the up-and-down counter 24 counts down the clock signals CLK 2. Therefore, when Ta>Tb, no carrier (low level signal, logical level "0") is produced as an output, and when Ta<Tb an output carrier (high level signal, logical level "1") is generated. A flip-flop 23 holds the value of the carrier for detecting the number of revolutions of the vane wheel as in the embodiment shown in FIG. 2.

Figure 6:
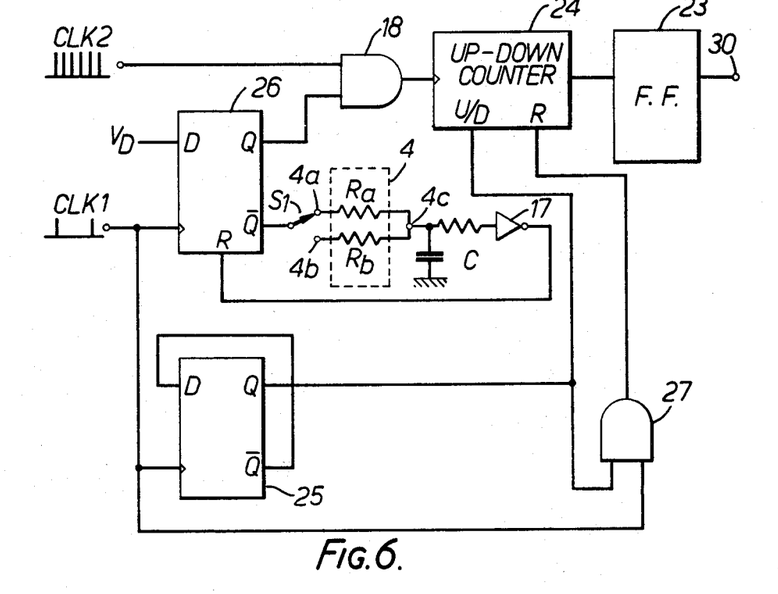

The monostable multivibrator composed of the gates 16, 17 shown in FIG. 5 may comprise a flip-flop as illustrated in FIG. 6. More specifically, a D-type flip-flop 26 produces an output having a logic level of "1" during the time interval Ta determined by the time constant of the resistor Ra and the capacitor C when the switch S1 is connected to the terminal 4A in synchronization with the clock signal CLK 1, thus allowing clock pulses CLK 2 to be delivered to the counter 24. Likewise, an output having a logic level of "1" is also supplied from the D-type flip-flop 26 to the AND gate 18, permitting the clock pulses CLK 2 to be supplied to the counter 24, during the time period Tb determined by the time constant of the resistor Rb and the capacitor C.

Figure 7:
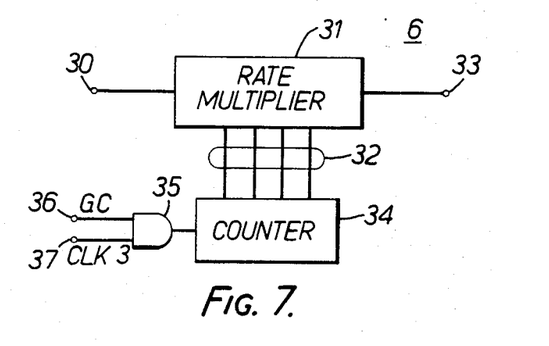
FIG. 7 is a block diagram of a signal converter circuit for use in the electronic integrating circuit illustrated in FIG. 1.

The output from the drive detection circuits shown in FIGS. 2, 5 and 6 is supplied to the signal converter circuit 6, which is shown in detail in FIG. 7. The output from the flip-flop 23 (FIGS. 5 and 6) is delivered as an input to a rate multiplier 31 via a terminal 30. The rate multiplier 31 may, for example, be TC 4527 BP BCD RATE MULTIPLIER manufactured by Toshiba Corporation.

The rate multiplier 31 is subject to weighting through terminals 32 such that it produces a number of output pulses via an output terminal 33 which are dependent on the number of input pulses as weighted in the rate multiplier 31. A pulse is thus needed to be differently weighted, for example, to compensate for different rates of flow of water per revolution of the vane wheel due to varying diameters of flow measuring pipes.

The terminals 32 of the rate multiplier 31 are connected to parallel terminals of a counter 34 having a clock input terminal to which the output of an AND gate 35 is connected. The AND gate 35 has a gate-controlling input terminal 36 and a clock input terminal 37 which are supplied with a gate-controlling signal and a clock signal, respectively.

Figure 8:
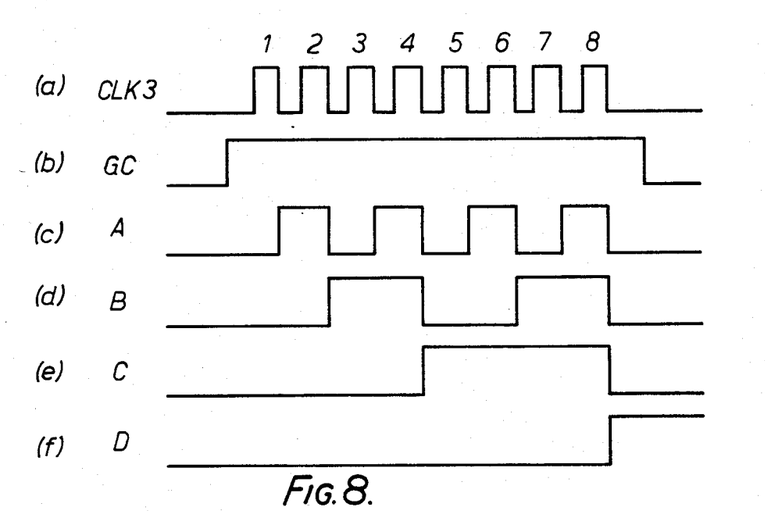
FIG. 8 is a timing diagram of signals in the signal converter circuit of FIG. 7.

Operation of the signal converter circuit thus constructed will be described with reference to FIG. 8. Designated in FIG. 8 at (a) is a train of clock pulses CLK 3 applied to the terminal 37 of the AND gate 35. To weight the rate multiplier 31, the gate-controlling signal GC at a logic level of "1" is supplied to the input 36 of the AND gate 35 to allow the AND gate 35 to pass a number of clock pulses CLK 3, shown in FIG. 8 at (b), which correspond to desired weighting. At this time, the counter 34 produces at its parallel terminals output signals A through D shown in FIG. 8 at (c) through (f), respectively. More specifically, when one clock pulse is applied to the counter 34, the latter generates outputs A, B, C, D having logic levels of 1, 0, 0, 0, respectively. When eight clock pulses are applied to the counter 34, the outputs A, B, C, D of the counter 34 have logic levels of 0, 0, 0, 1, respectively. With the gate-controlling signal GC having a logic level of "0", the content of the counter 34 remains unchanged if the clock signal CLK 3 varies. The rate multiplier is thus weighted by an external source.

Figure 9:
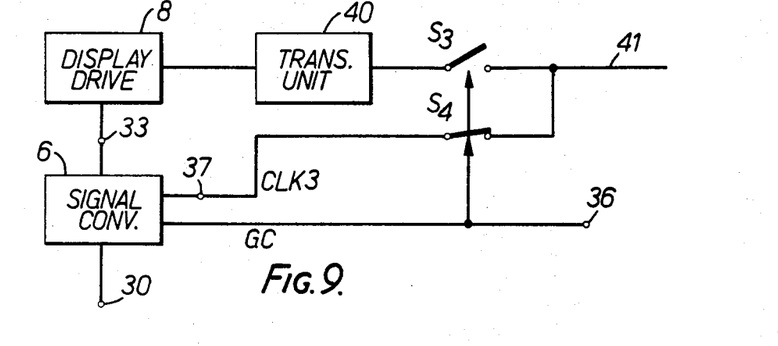
FIG. 9 is a block diagram of the signal converter circuit shown in FIG. 7, the diagram also showing a transmission system for the signal converter circuit.

The transmission line 41 connected to the transmission unit 40 may be utilized as a clock input terminal as shown in FIG. 9. Designated at S3, S4 are switches controlled by an input to the gate-controlling terminal 36. The switches S3, S4 are arranged such that the switch S3 is open and the switch S4 is closed when the input to the gate-controlling terminal 36 is at a logic level of "1". With the switch S4 closed, the transmission line 41 serves to deliver clock pulses supplied thereto to the counter 34 in the signal converter circuit 6.

When the input signal supplied to the gate-controlling terminal 36 is at a logic level of "0", the switch S3 is closed and the switch S4 is open, causing no change in the counter 34.

Use of at least three signal lines (including a grounding line) for integrating meters for measuring amounts of water consumed can readily effect weighting in the signal converter circuit. It is thus possible to reduce the number of pins where circuits for electronic meters are integrated. Weighting can be performed as desired by pulling out three signal lines after an electronic meter has been sealed off. Furthermore, the present invention can readily change forms of weighting dependent on various characteristics of individual meters. For example, where the rate multiplier 31 comprises a 10-bit binary counter, weighting of from $1/2^{10}$ to $(2^{10}-1)/2^{10}$ (1/1024 to 1023/1024) can be effected therein.

Figure 10:
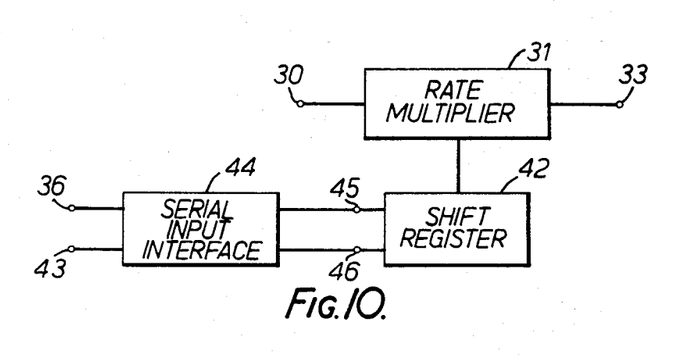
FIG. 10 is a block diagram of a signal converter circuit according to another embodiment of the invention.
Figure 11:
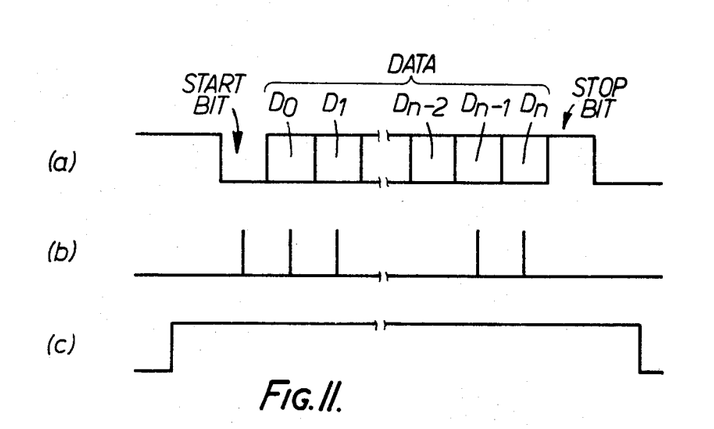
FIG. 11 is a diagram explanatory of operation of the signal converter circuit illustrated in FIG. 10.

Weighting in the rate multiplier 31 can be carried out by using a serial input interface as shown in FIG. 10. A shift register 42 is employed as a memory for effecting weighting in the rate multiplier 31. Weighted data is supplied from a serial data input terminal 43 via a serial input interface 44 to a data input terminal 45 of the shift register 42 after the interface 44 detects a start bit of a weighted data signal (FIG. 11(a)) with its following weighted data. The gate-controlling input terminal 36 is supplied with a gate-controlling signal (FIG. 11(c)). The serial input interface 44 generates shift clock pulses shown in FIG. 11 at (b) in synchronization with serial data shown in FIG. 11 at (a) and delivers such shift clock pulses to the shift register 42 via a shift clock input terminal 46. When the interface 44 detects a stop bit of the signal, it stops generating clock pulses. With the shift register 42 thus used, the signal converter circuit operates by employing two signal lines (for data input and grounding).

The electronic integrating meter of the invention has a pulse detecting circuit for producing a number of pulses proportional to the number of revolutions of the vane wheel through digital processing, and hence has no conventional circuit for amplifying and comparing analog signals. The electronic integrating meter is thus free of errors due to offsets in an operational amplifier and a comparator or variations in a reference voltage. The resistances Ra, Rb of the MR element, as they vary with rotation of the magnetic field, are determined for magnitude by relative magnitudes of the time constants RaC and RbC, with the result that the rotation of the magnetic field can be detected to a nicety even when the threshold voltage of the monostable multivibrator and the capacitance of the capacitor C fluctuate due to temperature changes and properties of the devices used. The drive detection circuit, the signal converter circuit, and the display drive circuit are all digital circuits which can be integrated easily as there are no amplifiers dealing with analog signals, resulting in a rotation detecting circuit that is composed of a reduced number of parts, small in size, reliable in operation, and less costly to manufacture.

The electronic integrating meter according to the present invention comprises a rate multiplier for producing a number of pulses corresponding to a set value in response to a clock input, measuring means for recording and holding the set value in the rate multiplier, and an input terminal for writing external data by way of serial input or clock input in the measuring means, so that weighting can readily be changed dependent on the purpose of the meter through the use of a digital circuit. When the meter is composed of an integrated circuit, the number of pins required for the circuit can be reduced.

The electronic integrating meter of the invention can be used to measure electricity by the addition of any simple device known in the art, wherein the flow of electric current being measured turns a shaft to which the magnet 2 is attached.

What is claimed is:

1. An electronic integrating meter comprising:
   a. a rotatable body;
   b. a magnet attached to said body to rotate therewith;
   c. a magneto-resistive element having at least first and second resistances, the values of which vary in response to rotation of said magnet;
   d. a means for developing first clock pulses;
   e. circuit means, coupled to said resistances and having first and second time constants which vary as a function of said first and second resistances, respectively, for developing first and second pulses at predetermined time intervals which each include a variable number of said first clock pulses in the form of a pulse train, each of said variable numbers of said first clock pulses being representative of a respective one of said first and second time constants during a selected one of said predetermined time intervals;
   f. means for determining which of successive first and second pulses has the greater number of said first clock pulses; and
   g. means, responsive to said means for determining, for indicating the occurrence of a revolution of said body.

2. An electronic integrating meter comprising:
   a. a rotatable body;
   b. a magnet attached to said body to rotate therewith;
   c. a magneto-resistive element having at least first and second resistances, the values of which vary in response to rotation of said magnet;
   d. a means for developing first clock pulses;
   e. circuit means, coupled to said resistances and having first and second time constants which vary as a function of said first and second resistances, respectively, for developing first and second pulses each beginning at regular intervals, said first and second pulses having variable lengths which correspond to said first and second time constants, respectively;
   f. means for selecting for each first and second pulse a number of said first clock pulses corresponding to be length of each said first and second pulse;
   g. means for determining which of first and second pulses, for selected ones of said regular intervals, has the greater number of said first clock pulses; and
   h. means, responsive to said means for determining, for indicating the occurrence of a revolution of said body.

3. The electronic integrating meter of claim 1 or 2 including means for weighting, by a selected factor, the output of said means for indicating the occurrence of a revolution of said body.

4. The electronic integrating meter of claim 3 wherein said means for weighting includes means for adjusting said factor.

5. An electronic integrating meter comprising:
   a. a rotatable body;
   b. a magnet attached to said body to rotate therewith;
   c. a magneto-resistive element having at least first and second resistances, the values of which vary in response to rotation of said magnet;
   d. a means for developing first clock pulses;
   e. circuit means, coupled to said resistances and having first and second time constants which vary as a function of said first and second resistances, respectively, for developing first and second pulses each beginning at regular intervals, said first and second pulses having variable lengths which correspond to said first and second time constants, respectively;
   f. means for selecting for each first and second pulse a number of said first clock pulses corresponding to the length of each said first and second pulse;
   g. means for determining which of first and second pulses, for selected ones of said regular intervals, has the greater number of said first clock pulses;
   h. means, responsive to said means for determining, for indicating the occurrence of a revolution of said body;
   i. means for producing a selected number of second clock pulses; and
   j. a rate multiplier including means for storing said selected number of second clock pulses, said rate multiplier being coupled to receive an output signal from said means for indicating the occurrence of a revolution of said body and said rate meter being operable to weight said output signal in response to said stored selected number of second clock pulses, whereby said rate multiplier provides a weighted indication of the number of revolutions of said body.

6. The electronic integrating meter of claims 1, 2 or 5 wherein said means for determining provides an output signal which indicates when said greater number of said first clock pulses in successive first and second pulses shifts from one to the other of said first and second pulses.

7. The electronic integrating meter of claim 6 wherein said circuit means for developing first and second pulses includes a monostable multivibrator alternately responsive to said first and second time constants during successive ones of said time intervals.

8. The electronic integrating meter of claim 6 wherein said means for determining includes first and second counters for counting said first clock pulses in said first and second pulses, respectively, for each successive one of said time intervals, and a comparator which produces said output signal of said means for determining when said greater number of said first clock pulses in successive first and second pulses shifts from one to the other of said first and second pulses.

9. The electronic integrating meter of claim 6 wherein said means for determining includes an up-down counter for adding said first clock pulses in said first pulses and for subtracting therefrom said first clock pulses in said second pulses and which, in response to said adding and subtracting, produces a change in said output signal of said means for determining when said greater number of said first clock pulses in successive first and second pulses shifts from one to the other of said first and second pulses.

10. The electronic integrating meter of claim 6 wherein said means for indicating the occurrence of a revolution of said body comprises a flip-flop connected to the output of said means for determining.

* * * * *